Figure 1:
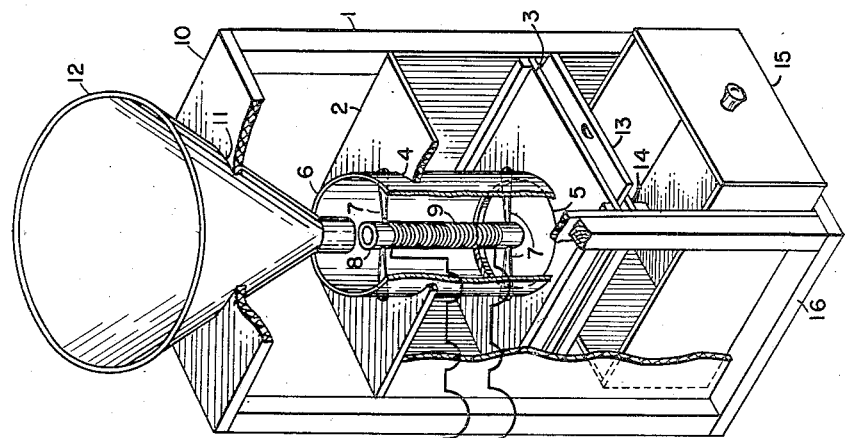

March 4, 1958     J. R. HART     2,825,870

APPARATUS FOR DETERMINING MOISTURE IN SEEDS AND GRAIN

Filed Sept. 7, 1954

INVENTOR
JOSEPH R. HART

BY
ATTORNEYS

United States Patent Office

2,825,870
Patented Mar. 4, 1958

2,825,870

APPARATUS FOR DETERMINING MOISTURE IN SEEDS AND GRAIN

Joseph R. Hart, Beltsville, Md.

Application September 7, 1954, Serial No. 454,643

2 Claims. (Cl. 324—40)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to an apparatus for determining the moisture content of grain or seed by comparing the effects on an oscillating circuit of the test sample with samples having known moisture content.

It is one object of the invention to provide an apparatus by means of which the moisture content may be determined by measuring a change in the characteristics of a portion of a high frequency oscillating circuit.

Another object is to provide such an apparatus in which the measurement can readily be translated into percent moisture content.

A further object is to provide an apparatus of such construction as will permit obtaining uniform results.

These and other objects which will become apparent are achieved by the apparatus of this invention.

In order that the invention may be readily understood, reference will be made to the following description and the accompanying drawings.

Figure 2:
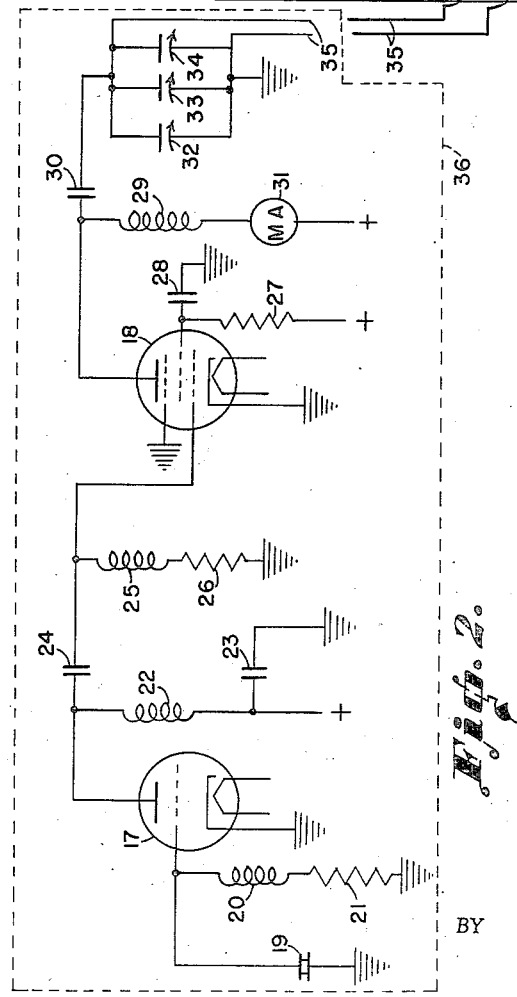

In the drawings:

Figure 1 is an elevation, partly in section, showing the test cell and its supporting structure; and Figure 2 is a diagram of the oscillating circuit.

In particular, the instrument comprises two parts, namely (1) a test cell with a coil in the center, and the accompanying supporting structure, and (2) the electrical portion which comprises the oscillating circuit. The coil in the center of the test cell is part of a tuned resonator used in conjunction with an oscillator; the two together forming the above-mentioned oscillating circuit.

The apparatus comprises an open supporting framework 1 which has two horizontal platforms 2 and 3 secured at intermediate points in the frame. Each platform is provided with concentric circular holes 4 and 5. An open ended non-conducting plastic cylinder 6 extends through upper hole 4 and is supported on lower platform 3 directly over lower hole 5. This cylinder is the container or test cell in which the seed or grain are held while moisture determinations are being made. Rigidly mounted coaxially within cylinder 6, and separated therefrom by insulators 7, is non-conducting coil form 8 on which coil 9 is wound. This coil is the coil in the resonating circuit which will be more fully described below. Connection between coil 9 in the measuring portion of the apparatus and the rest of the electrical circuit mounted on chassis 36 is made by means of coaxial cable 35. At the top of the framework is a platform 10 provided with a hole which is concentric with holes 4 and 5 in the lower platforms. A funnel 12 is inserted in hole 11 for the purpose of filling the test cell. Directly beneath lower platform 3 is a sliding shelf 13 which slides on guides 14 and which serves to support the material being tested within the test cell. A receiving box 15 rests on base 16 and is provided for the purpose of receiving the grain or seed after it has been tested. Box 15 is not secured to the base and may be removed when it is desired to dispose of the already tested material.

In the preferred form the height of the frame is 20 inches, the width 9 inches, and the depth 7 inches. The diameter of the test cell is 3 inches and is 7 inches high, while the diameter of the coil is one inch. While every coil has the properties of inductance and distributed capacity, these dimensions are so chosen that the addition of a test sample to the cell will cause the distributed capacity to be the property most varied.

The electrical portion of the apparatus comprises a conventional crystal-controlled oscillator and resonator. In a preferred form a 6C5 tube 17 is employed in the oscillating circuit and a 6AG7 tube 18 in the resonating circuit. The remaining elements as used in the circuit are tabulated below:

| | | |
|---|---|---|
| Cell coil 9 | microhenries | 25 |
| Crystal 19 | megacycles | 3.5 |
| Inductance 20 | millihenries | 2.5 |
| Resistance 21 | ohms | 15,000 |
| Inductance 22 | millihenries | 80 |
| Condenser 23 | mfd | .005 |
| Condenser 24 | mfd | .005 |
| Inductance 25 | millihenries | 2.5 |
| Resistance 26 | ohms | 22,000 |
| Resistance 27 | do | 25,000 |
| Condenser 28 | mfd | .005 |
| Inductance 29 | millihenries | 2.5 |
| Condenser 30 | mfd | .005 |
| Milliammeter 31 | ma | 0– 25 |
| Variable condenser 32 | mmf | 0–100 |
| Variable condenser 33 | mmf | 0– 15 |
| Variable condenser 34 | mmf | 0– 1 |

In actual operation, the resonant circuit is first tuned to oscillation with the cell empty of everything but air by adjusting variable condensers 32, 33, and 34 until the reading on milliammeter 31 is a minimum. This is taken as the zero reading. A sample of grain or seed containing a known amount of moisture, as determined by actual chemical analysis, is then poured into the cell through funnel 12 so that it completely fills both the outer cylinder 6 and the inside of coil form 8. The presence of a material other than air about the coil 9, changes its electrical characteristics, and condensers 32, 33, and 34 have to be reset to bring the circuit back to resonance. The sizes of these condensers are so chosen that the adjustments are of increasing fineness. Numbered dials may be provided on each condenser so that readings may be recorded for purposes of calibration and actual analysis. After a reading has been taken with the first sample of known moisture content, the test cell is emptied by pulling out shelf 13 and several more samples of different, but known, moisture content are tested in a similar fashion. These readings are charted on graph paper as percentage moisture against dial readings. It has been found that a straight line relationship exists between these two factors. It is thus possible to calibrate the instrument by drawing the characteristic straight line for each type of grain or seed which it is contemplated will be used. Once a set of calibration curves have been obtained all that is necessary to determine the percentage moisture in an unknown sample is to fill the cell with it, adjust the resonant circuit to oscillation and note the dial readings. Using this reading, the moisture content can readily be found from the appropriate calibration curve for the type of material by reading the value that corresponds to the dial reading.

The results obtained with the above-described instruments are reproducible and are exceptionally accurate. If the same funnel and same volume of test material are always used, the rate of flow for any given type of material into the cell will always be approximately the same, with the result that the particles will always fill the cell with the same degree of compactness. Since the dielectric properties of the material are affected by the degree of packing, this method of filling the cell contributes to the accuracy of the instrument.

It will readily be understood by those skilled in the art that the form of the apparatus described above may be changed as to size, shape, electrical values, and arrangement of parts without departing from the spirit of the invention. Any of the well known circuits which produce high frequency oscillation and which contain a parallel-resonant circuit comprising a coil and variable condenser may be used.

I claim:

1. Apparatus for determining the percent moisture in grain or seed comprising: a first hollow non-conducting cylinder; a second hollow non-conducting cylinder of smaller diameter rigidly mounted coaxially within the first cylinder; closure means removably mounted beneath the first and second cylinders and forming with said cylinders a pair of concentric containers open at the top and closed at the bottom; filling means rigidly supported above said cylinders in such position as to cause material whose moisture content is to be determined to fill both the inner cylinder and the space between the inner and the outer cylinder; and a coil of wire wound around the inner cylinder, said coil constituting the inductance element of a tuned high frequency oscillating circuit, said coil possessing the electrical properties of inductance and distributed capacity, said coil being so adapted that, upon addition of grain or seed to the inner cylinder and to the space between the inner cylinder and outer cylinder, the distributed capacity is the property most varied.

2. Apparatus for determining the percent moisture in grain or seed which comprises a hollow non-conducting first cylinder; a second hollow non-conducting cylinder of smaller diameter rigidly mounted coaxially within the first cylinder; a coil of wire wound around the second cylinder, said coil constituting the inductance element of a tuned high frequency oscillating circuit and possessing the electrical properties of inductance and distributed capacity; filling means rigidly supported above said cylinders in such position as to cause material whose moisture content is to be determined to fill the second cylinder, the space between the first and second cylinders, and the space between the coil windings to a uniform compactness; means for maintaining the material stationary while in the apparatus thereby maintaining said material in the state of uniform compactness; and means connected to said coil for measuring the change in the electrical properties of the coil due to the presence of material in the apparatus.

References Cited in the file of this patent

UNITED STATES PATENTS

| | | |
|---|---|---|
| 1,822,604 | Simons et al. | Sept. 8, 1931 |
| 2,266,114 | Bartlett | Dec. 16, 1941 |
| 2,373,846 | Olken | Apr. 17, 1945 |
| 2,505,778 | Limbach | May 2, 1950 |
| 2,696,588 | Criner | Dec. 7, 1954 |
| 2,772,393 | Davis | Nov. 27, 1956 |